United States Patent Office 3,261,681
Patented July 19, 1966

3,261,681
METHOD OF REMOVING SILICON FROM GERMANIUM INGOTS
Toshio Abe, Kawasaki-shi, and Masaji Kanazawa and Taizo Ohashi, Tokyo, Japan, assignors to Tokyo Shibaura Electric Co., Ltd., Horikawacho, Kawasaki-shi, Japan, a corporation of Japan
No Drawing. Filed Nov. 16, 1962, Ser. No. 238,296
Claims priority, application Japan, Nov. 18, 1961, 36/41,326
2 Claims. (Cl. 75—84)

The present invention relates to methods of removing silicon from germanium ingots.

In the past, removal of silicon from germanium ingots has been effected either by a chemical recovery process such as one in which germanium is converted into germanium tetrachloride, which is subsequently distilled, or by the zone refining process which is performed with germanium ingots practically maintained in the solid state. The chemical process is very expensive while the zone refining process is disadvantageous because of the gradual increase in the silicon content in a lot of germanium ingots when cropped tips thereof are pooled for repeated use.

It is known that the presence of silicon as an impurity in germanium ingots generally results in the presence of minute particles of silicon dioxide in the melt because of the minute amount of oxygen or steam contained in the atmosphere in which zone refining is performed or in which single crystals are formed. The presence of such minute particles, for example, in a single crystal causes the formation of so-called anomalous pits in such crystal, which are circular and smooth, and serve to increase the rate of acid corrosion while causing deterioration of the inverse characteristics of semiconductor devices formed of such crystals. However, since the distribution coefficient, $k$ of silicon in germanium is equal to or greater than one, silicon tends to be deposited at the starting end of the ingot. After this refining process, the ingot end is cropped. Such cropped ends are usually pooled and further utilized for growing single crystals therefrom. As such procedure is repeated, successive lots of germanium ingots have a progressively increasing silicon content. It is desired, therefore, to provide a method of removing silicon from germanium ingots while obviating the above difficulty.

The present invention is intended to meet such a requirement in the industry by providing a method of removing silicon in a very simplified manner even from the starting sections of germanium ingots, cropped in the zone refining thereof and thus having a high concentration of silicon.

According to the present invention, there is provided a method of removing silicon from germanium material comprising entirely melting or zone melting the material in an oxidizing atmosphere including a substance having an oxygen atom or atoms in its molecular formula in such an amount that the oxygen portion thereof produces a partial pressure of 0.001 to 0.1 atmosphere thereby to allow the silicon impurity to float to the surface of the melt in the form of silicon dioxide due to the difference in specific gravity between the germanium melt and the silicon dioxide thus formed. The silicon dioxide is subsequently removed by suitable means. In the above process, some oxygen tends to enter the germanium melt, as is expected, but it can be completely removed by remelting the germanium material in a reducing atmosphere free from oxygen or steam and allowing the material to resolidify.

According to the present invention, it is required that the oxidizing atmosphere employed includes a gaseous substance containing oxygen at a partial pressure of 0.001 to 0.1 atmosphere. The reason for this limitation is that a partial pressure lower than 0.001 atmosphere reduces the refining effect while a partial pressure higher than 0.1 atmosphere causes excessive oxidation and hence dissipation of the germanium material and heavily damages the vessel.

In general, the amount of minute particles of silicon dioxide in a single crystal of germanium is proportional to approximately 1.5 powers of the density, $Nc$, of anomalous pits, and thus conveniently expressed by $Nc$, as the amount of silicon dioxide in germanium cannot be quantitatively determined by spectroscopic analysis. Some single crystals of germanium formed in the conventional manner have an $Nc$ as much as approximately 10,000 to 20,000/cm.$^2$. For example, single crystals of germanium formed in a reducing atmosphere and containing approximately 0.01% by weight of silicon have an $Nc$ of up to 5,000/cm.$^2$. In contrast with this, single crystals formed according to the present invention by repeating thrice the zone melting of the same germanium material, for example, in an argon atmosphere containing 0.01% by volume of oxygen and at the rate of zone travel of one millimeter per minute have a reduced $Nc$ of approximately 500/cm.$^2$. On this occasion, a large quantity of silicon dioxide floats to the surface of the germanium ingot being zone-melted in the form of a white film and is removed by suitable means. Similarly, in the case of a germanium ingot containing approximately 0.01% by weight of silicon which is entirely melted in a similar oxygen-containing argon atmosphere for an hour and then allowed to resolidify, a large quantity of silicon floats to the surface of the ingot in the form of a film of silicon dioxide and may be removed. Single crystals formed of the germanium material as refined by the above two methods, that is, by zone melting and entire melting in the same oxidizing atmosphere exhibit the same reduced density of approximately 500/cm.$^2$. As will readily be appreciated from the foregoing, the method of the present invention is effective for reducing the pit density, $Nc$, of single crystals of germanium. The oxygen content of the atmosphere and the melting time used in the inventive method can conveniently be determined by experiments depending upon the proportion of the silicon impurity contained in the germanium material.

The method of the present invention has an additional advantage in that any of the readily oxidizable elements other than silicon and including calcium, magnesium and aluminum are also oxidized to float to the ingot surface simultaneously with the silicon dioxide and thus can readily be removed.

A few practical examples of the method of the present invention will be described below.

*Example 1*

A germanium ingot was put into a vessel of quartz or graphite. In an oxidizing atmosphere of normal atmospheric pressure and comprised of nitrogen, argon, neon, helium or hydrogen or any mixture of these elements, containing 0.1 to 10% by volume of oxidizing gas being at least one of oxygen, steam and carbon dioxide, the germanium ingot was entirely melted and resolidified or subjected to zone melting. Silicon contained in the germanium ingot floated to the surface of the melt in the form of a white film of silicon dioxide, which was subsequently removed.

*Example 2*

A germanium ingot was put into a vessel of quartz or graphite and was entirely melted and resolidified or subjected to zone melting in an atmosphere at a pressure of one to five atmospheres. The atmosphere used was comprised of nitrogen, argon, neon, helium or hydrogen or any mixture of these elements and contained oxidizing gas being at least one of oxygen, steam or carbon dioxide in such an amount that the oxygen portion thereof produces a partial pressure of 0.001 to 0.1 atmosphere. Silicon contained in the germanium ingot was removed in the same manner as in Example 1.

*Example 3*

A germanium ingot was entirely melted or subjected to zone melting in a reduced-pressure vessel and held in an atmosphere containing at least one of oxygen, steam and carbon dioxide in such an amount that the oxygen portion thereof produces a partial pressure of 0.001 to 0.1 atmosphere. Silicon contained in the ingot was oxidized to silica, floated to the ingot surface and was removed as in the preceding examples.

The germanium ingot refined in each of the examples was employed to form single crystals, all of which exhibited a pit density, $N_c$, of $1,000/cm.^2$ or under.

What is claimed is:

1. A method of removing silicon from a germanium ingot comprising melting the ingot in an oxidizing atmosphere comprising a mixture of at least one gas selected from the group consisting of nitrogen, argon, neon, helium and hydrogen, and at least one gas selected from the group consisting of oxygen, steam and carbon dioxide in such an amount that the oxygen portion thereof produces a partial pressure of 0.001 to 0.1 atmosphere, repeating the melting of said germanium ingot thereby to allow silicon contained in the germanium ingot to float to the surface of the melt in the form of silicon dioxide, and removing the silicon dioxide thus formed.

2. A method as set forth in claim 1 in which the oxidizing atmosphere is comprised of a mixture of argon gas containing 0.01% by volume of oxygen.

References Cited by the Examiner

FOREIGN PATENTS 166,398  12/1955  Australia.
794,642  5/1958  Great Britain.

LEON D. ROSDOL, *Primary Examiner.*

BENJAMIN R. PADGETT, *Examiner.*

M. J. SCOLNICK, *Assistant Examiner.*